United States Patent [19]
Oxford

[11] Patent Number: 5,337,100
[45] Date of Patent: Aug. 9, 1994

[54] CAMERA QUICK RELEASE

[76] Inventor: Jerry J. Oxford, 61 Jordan Ct., Lawrenceville, Ga. 30244

[21] Appl. No.: 144,635

[22] Filed: Oct. 28, 1993

[51] Int. Cl.$^5$ ............................................. G03B 29/00
[52] U.S. Cl. ......................................................... 354/81
[58] Field of Search ............................... 354/81, 80, 82

[56] References Cited

U.S. PATENT DOCUMENTS

| | | | |
|---|---|---|---|
| 3,693,921 | 9/1972 | Beaucher | 248/187 |
| 4,736,217 | 4/1988 | McDowell | 354/81 |
| 4,889,189 | 2/1990 | Frost | 354/293 |
| 4,959,671 | 9/1990 | Ishikawa | 354/81 |
| 5,081,478 | 1/1992 | Hayashida et al. | 354/81 |
| 5,267,712 | 12/1993 | Shen | 354/81 |

*Primary Examiner*—Russell E. Adams
*Assistant Examiner*—Nicholas J. Tuccillo
*Attorney, Agent, or Firm*—James A. Hinkle

[57] ABSTRACT

A camera quick release has a fastener axle that can be inserted into a fastener orifice in a fastener housing where a side-grip fastener lock is spring-pressured against a cylindrical wall of the fastener axle to hold the fastener axle circumferentially and linearly in a set position. The side-grip fastener lock is releasable by hand-squeezing a latch handle and a housing handle which combine to form a squeeze-handle. With the fastener lock released, the fastener axle attached to the camera or other instrument can be rotated as far or as little as desired to a different circumferential setting or it can be removed linearly for removal of the camera or other instrument. The fastener axle has a fastener bolt that is threadable into a camera-attachment bolt hole where it can be secured with a convenient thread-locking means.

28 Claims, 3 Drawing Sheets

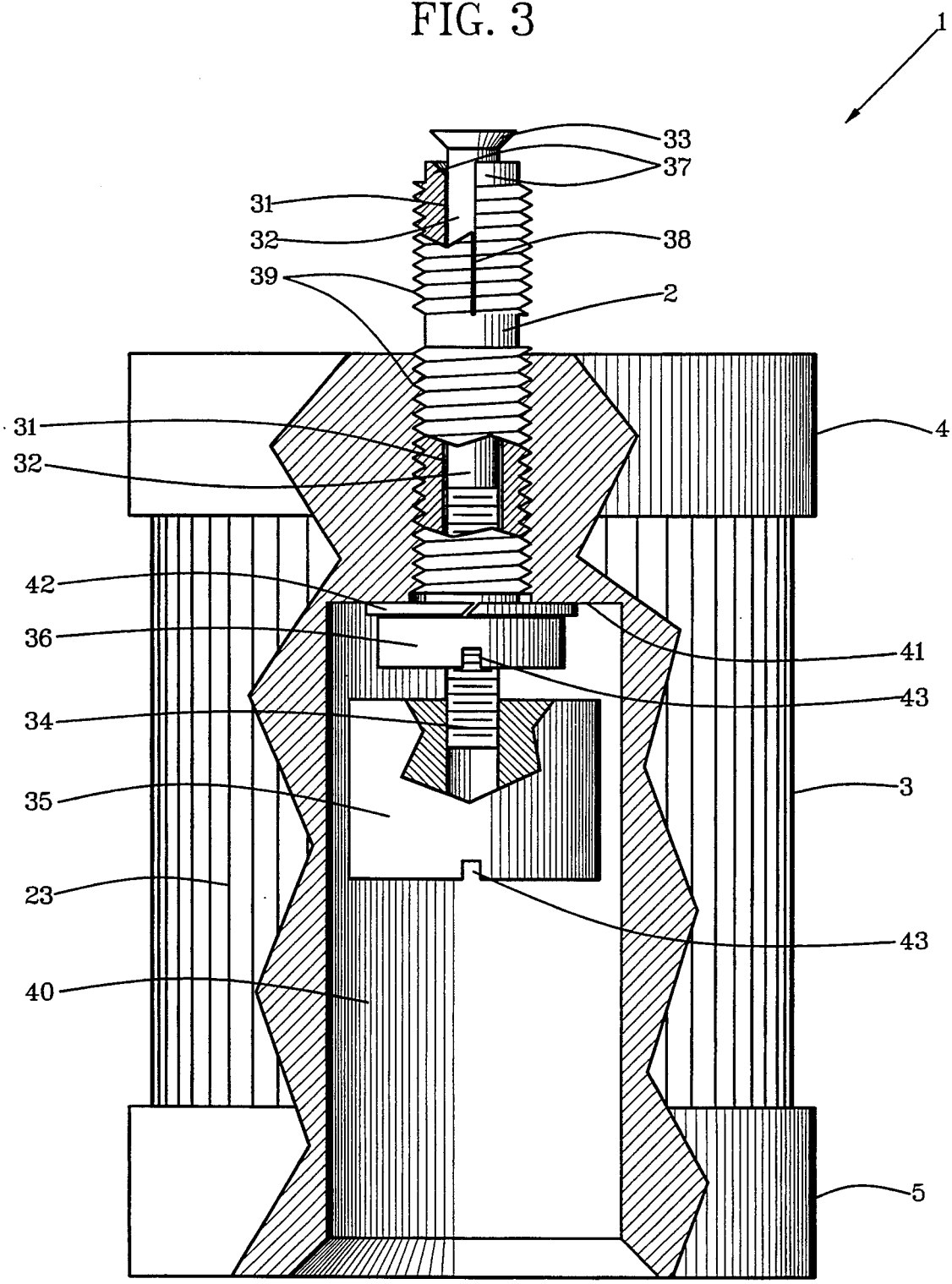

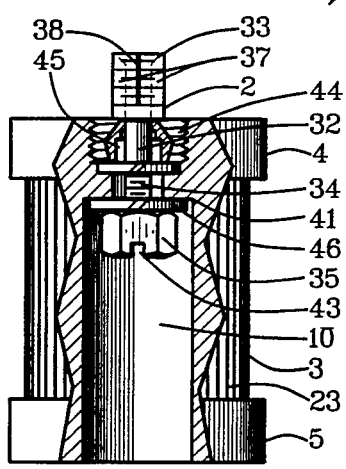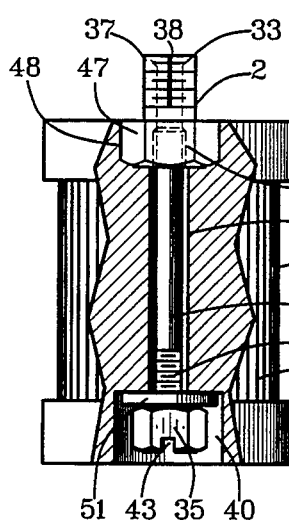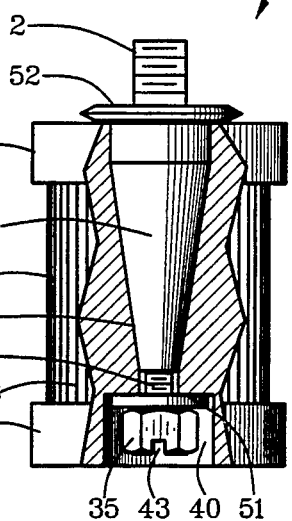

CAMERA QUICK RELEASE

BACKGROUND OF THE INVENTION
1. Field of the Invention

The present invention relates generally to the field of quick-release fasteners of cameras to a tripod or other stand, and in particular it relates to side restriction of a fastener axle in a camera quick-release for selective circumferential positioning and for quick-release mounting of a camera on a tripod or other stand.
II. Description of the Prior Art Different from a prior U.S. patent application having Ser. No. 07/955,642 filed by the same inventor, this invention employs side restriction of a fastener axle instead of end restriction of a fastener stud for fixing selective circumferential positioning and for quick-release mounting of a camera on a tripod or other stand. Also different, this invention employs a squeeze-handle that quick-releases both circumferential positioning and camera attachment. This squeeze-handle permits one-handed circumferential adjustment and quick-release attachment of the camera to a camera stand. One-handed positioned adjustment is highly important for a user's other hand for other photographic activities. Further yet different, this invention employs a novel means for thread-locking a camera-attachment bolt in a camera-attachment bolt hole in order to allow the fastener axle to remain attached to a particular camera when being used intermittently.

SUMMARY OF THE INVENTION

In accordance with the present invention, it is contemplated that one object is to provide one-handed circumferential adjustment of a camera or other instrument on a stand in order to free a user's other hand for other operational activities.

Another object is to permit one-handed quick release of a camera or other instrument from a stand in order to free a user's other hand for grasping and removing the camera or other instrument when it has been quick-released with the other hand.

This invention accomplishes the above and other objectives with a fastener axle that can be inserted into a fastener orifice in a fastener housing where a side-grip fastener lock is spring-pressured against a cylindrical wall of the fastener axle to hold the fastener axle circumferentially and linearly in a set position. The side-grip fastener lock is releasable by hand-squeezing a latch handle and a housing handle which combine to form a squeeze-handle. With the fastener lock released, the fastener axle attached to the camera or other instrument can be rotated as far or as little as desired to a different circumferential setting or it can be removed linearly for removal of the camera or other instrument. The fastener axle has a fastener bolt that is threadable into a camera-attachment bolt hole where it can be secured with a convenient thread-locking means.

Other objects, advantages and capabilities of the invention will become apparent from the following description taken in conjunction with the accompanying drawings showing preferred embodiments of the invention.

BRIEF DESCRIPTION OF THE DRAWINGS

FIG. 3 is a cutaway elevation view of a preferred embodiment of the fastener axle with its internal structure and components for a split-bolt thread-locking means;

FIG. 4 is a cutaway elevation view of the fastener axle with a threaded-head attachment bolt;

FIG. 5 is a cutaway elevation view of the fastener axle with a hex-head attachment bolt and a lock bolt having length sufficient for additional thread-locking resilience;

FIG. 6 is a cutaway elevation view of the fastener axle with a cone-head attachment bolt and a smooth-surface lock washer as a thread-locking means;

FIG. 7 is a cutaway elevation view of a fastener axle that allows use of a hard-metal fastener-lock section and a hand-adjustable lock nut with aluminum construction of the fastener axle;

FIG. 8 is a cutaway elevation view of a fastener axle that allows use of a split-bolt thread-locking means in conjunction with a hard-metal fastener-lock section and long-bolt thread-locking resilience;

FIG. 9 is a sectional top view of the FIG. 2 illustration of the camera quick release with a rubber:r-like lock latch; and FIG. 10 is a sectional top view of the FIG. 9 illustration with a single-tooth lock latch.

DESCRIPTION OF THE PREFERRED EMBODIMENTS

Figure 1:
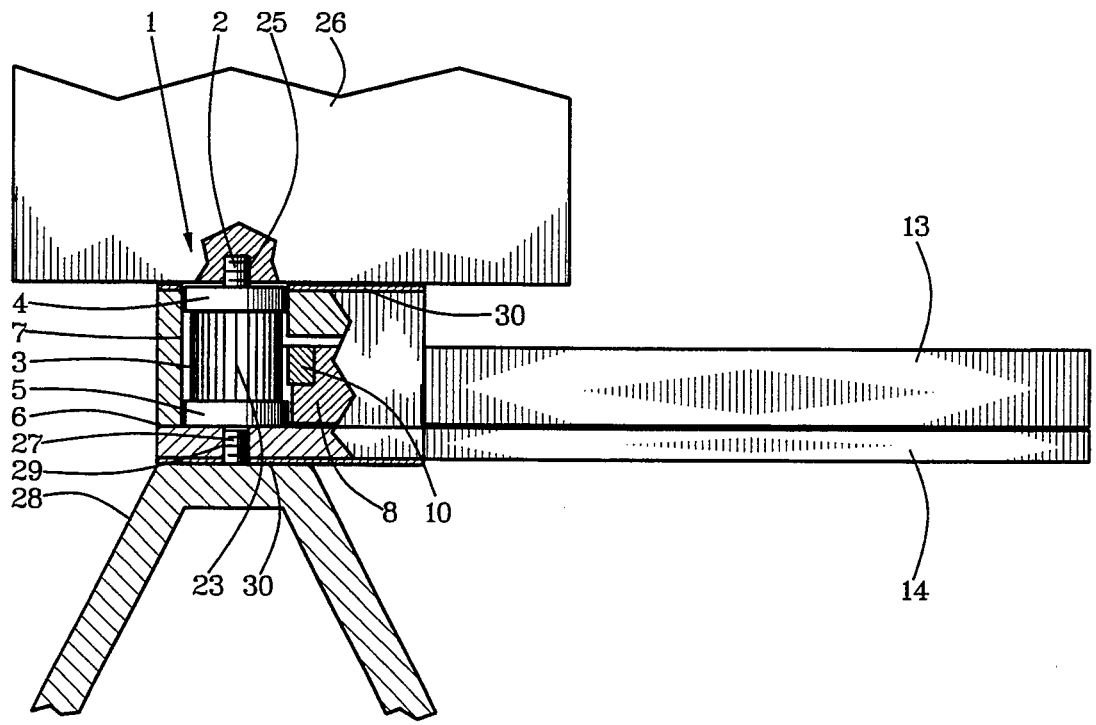
FIG. 1 is a cutaway elevation side view showing a camera attached to a top of the camera quick release and a tripod attached to a bottom of the camera quick release.
Figure 2:
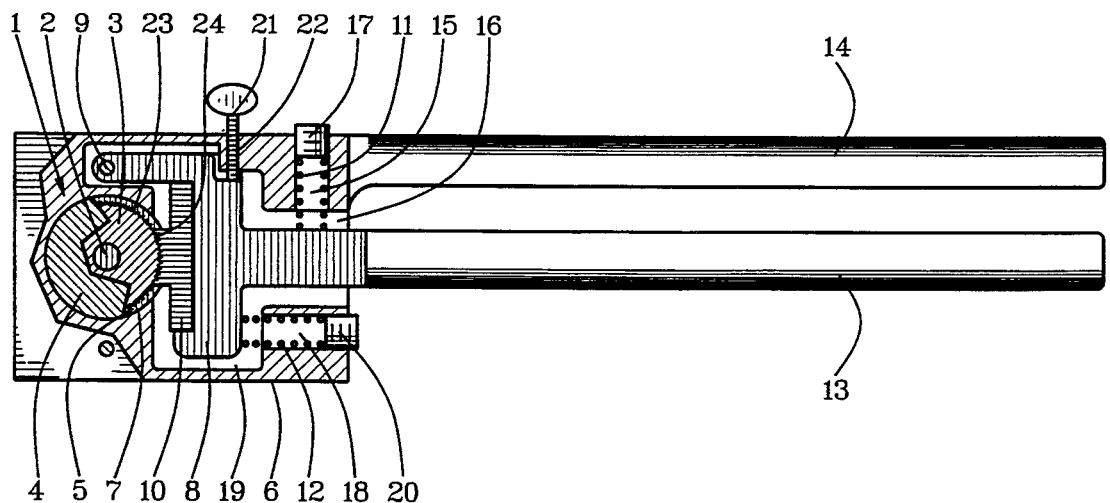
FIG. 2 is a top view of the camera quick release having a multiple-tooth lock latch.

Referring to the drawings wherein like reference numerals designate corresponding parts throughout the several figures, reference is first made to drawing FIGS. 1 and 2, this invention is described in relation to components which are numbered the same on the drawings as in this description. A fastener axle 1 having an attachment bolt 2 extended from an attachment end of the fastener axle 1 has a fastener-lock section 3 intermediate an outside bearing section 4 and an inside bearing surface 5. A fastener housing 6 has a fastener bay 7 with a cylindrical inside periphery in which the fastener axle 1 is insertable with the outside bearing section 4 and the inside bearing section 5 in rotational contact with the cylindrical inside periphery of the fastener bay 7.

A lock latch 8 is pivotal on a latch axle 9 that is attached to the fastener housing 6 in parallel relationship to axes of the fastener bay 7 and the fastener axle 1. A fastener lock 10 on the lock latch 8 can be positioned in rotationally locking relationship to the fastener-lock section 3 by pivoting of the lock latch 8 in a direction towards the fastener axle 1.

The lock latch 8 is spring-pressured in a pivotal direction towards the fastener axle 1 by either a handle spring 11 or a latch spring 12 or by both the handle spring 11 and the latch spring 12 as preferred for different design factors. Spring pressure of either or both springs 11 and 12 maintains the lock latch 8 in rotationally locked relationship to the fastener-lock section 3 unless the lock latch 8 is pivoted to an unlocked relationship to the fastener-lock section 3 by hand-squeezing a latch handle 13 that is extended from the lock latch 8 towards a housing handle 14 that is extended from the fastener housing 6.

The handle spring 11 is preferably a coil spring that is positioned in a handle-spring orifice 15 intermediate a handle channel 16 and an outside periphery of the fastener housing 6. The handle spring 11 is buttressed by a handle-spring set screw 17. The latch spring 12 also is preferably a coil spring that is positioned separately in a latch-spring orifice 18 intermediate a latch 15 channel 19 and an outside periphery of the fastener housing 6. In like manner, the latch spring 12 is buttressed by a latch-spring set screw 20.

The handle spring 11 is perpendicular to the latch handle 13. At a right angle, the latch spring 12 is perpendicular to the lock latch 8.

A lock-engagement bolt 21 is threadable selectively in a lock-bolt orifice 22 in parallel relationship to either spring 11 or 12. The lock-engagement bolt 21 maintains the lock latch 8 with the fastener lock 10 in locked relationship to the fastener-lock section 3 for use of the handles 13 and 14 together as a single handle.

The fastener-lock section 3 in this embodiment is provided with a plurality of axle serrations 23 that are positioned linearly intermediate the outside bearing section 4 and the inside bearing section 5 of the fastener axle 1. These axle serrations 23 are placed circumferentially on the outside periphery of the fastener-lock section.

Matching the axle serrations 23 are a plurality of lock serrations 24 that are juxtaposed arcuately on the fastener lock 10. The lock serrations 24 are sized and shaped to be interspersed in juxtaposed relationship between the linear axle serrations 23 when the lock latch 8 is pivoted by pressure of 15 springs 11 and/or 12 to a locking relationship. In FIG. 2, the lock serrations 24 are juxtaposed between axle serrations 23 with common contact lines such that a line of contact between them is not portrayed.

In FIG. 1, the attachment bolt 2 is shown screwed into a camera bolt hole 25 in a camera 26. A tripod attachment bolt 27 on a tripod 28 or other platform is shown screwed into an attachment-bolt hole 29 in the fastener housing 6. Without this camera quick release, the camera 26 is mounted directly to the tripod 28. Dimensions of the attachment bolt 2 and its threading, therefore, are the same as for the tripod attachment bolt 27.

Cushioning material 30 can be positioned on tops and bottoms of the fastener housing 6 to protect against marring surfaces of a camera or other equipment attached with this camera quick release. Use of the cushioning material 30 is a tradeoff related to structural design and materials of the fastener housing 6.

Referring to FIG. 3, a preferred embodiment of the fastener axle 1 has an attachment bolt 2 with a bore 31 comprising an axial lock orifice in which is inserted a lock bolt 32 having a conical head 33 and a threaded shaft 34 that is extended to a position of threadable engagement with a lock-bolt nut 35 that can be positioned in contact with a bolt-head end of an attachment-bolt head 36 of the attachment bolt 2- The attachment bolt 2 has a split end 37 with a separation channel 38 extended through opposite sides of the split end 37. A terminal end of an insider periphery of the bore 31 can be tapered to match a conical angle on the conical head 33 of the lock bolt 32. Opposite sides of the split end 37 of the attachment bolt 2 can be spread apart against metallic resilience moment of the attachment bolt 2 by rotation of the lock-bolt nut 35 in a rotational direction which draws the conical head 33 of the lock bolt 32 against the split end 37 of the attachment bolt 2 while the lock-bolt nut 35 is supported by the attachment-bolt head 36.

Spreading of the split end 37 locks attachment-bolt threads 39 of the split end 37 tightly in threads of the camera bolt hole 25. This locks the fastener axle 1 onto a camera 26 for reliable circumferential settings and for intermittent use as desired. In this embodiment also, the attachment bolt 2 is threaded into the fastener axle 1 with attachment-bolt threads 39 that extend from proximate the split end 37 to proximate the attachment-bolt head 36 in a bolt-head recess 40 in an insertional end or inside end of the fastener axle 1.

Between a base wall 41 of the bolt-head recess 40 and the attachment-bolt head 36, an attachment lock washer 42 can be employed to assure locking of attachment-bolt threads 39 in the fastener axle 1. This is in addition to locking attachment-bolt threads 39 at the split end 37 in a camera bolt hole 25.

Wrench surfaces on the attachment-bolt head 36 and on the lock-bolt nut 35 can be screw slots 43 as shown. An outside hex for a socket wrench or an internal hex for a hex rod also can be employed as wrench surfaces.

Referring to FIG. 4, a fastener bolt 2 can have a threaded bolt head 44 that is threaded directly into the fastener axle 1. The threaded bolt head 44 can have an internal hex 45 as wrench surfaces that decrease length of small-bore machining of the bore 31. A lock washer can be employed to thread-lock the threaded bolt head 44 in the fastener axle 1. Then the lock bolt 32 can be drawn tightly between a base wall 41 and the conical head 33 to spread opposite sides of the split end 37 to thread-lock attachment-bolt threads 39 in a camera bolt hole 25 shown in FIG. 1.

A lock-bolt lock washer 46 is recommended to maintain split-end expansion pressure with conversion of linear pressure to lateral pressure by means of the conical head 33. The lock-bolt lock washer 46 is recommended due to a lack of resilient expansion pressure in the split end 37. Instead, the split end 37 has inward resilience without application of linear pressure by a spring-loaded lock-bolt lock washer 46.

Referring to FIG. 5, an attachment bolt 2 can have a hex head 47 that is fit into a hex orifice 48 in the fastener axle 1. This also decreases length of small-bore machining of the bore 31. A large bore section 49 can be provided from a head side of the hex head 47 to decrease further the length of bore 31. In addition, the bolt-head recess 40 can be short with a long but relatively large-diameter bolt bore 50 extended from the hex orifice 48 to the bolt-head recess 40. This embodiment allows drilling of the longer bolt bore 50 to be in aluminum which is less expensive to drill deeply and which provides thread-locking resilience. In addition to thread-locking resilience of the aluminum, length of the lock bolt 32 from the hex head 47 to the lock-bolt nut 35 can be great enough in proportion to diameter of the lock bolt 32 to provide thread-lock resilience in the lock bolt 32 without a lock washer. However, a plain washer 51 can be employed to avoid wear of a hard-metal lock-bolt nut 35 on an aluminum surface of a fastener axle 1. Resilience of an aluminum fastener axle 1 and of the long lock bolt 32 can provide more than ample resilience to maintain locking resilience of the split end 37 in a camera bolt hole 25.

Referring to FIG. 6, a thread-locking means for fastener bolt 2 need not be an expansion type such as provided with the split end 37 and the lock bolt 32 with a conical head 33. Instead, as a design alternative, the thread-lock means can be a linear-expansion washer, provided it does not have sharp edges like most spring-loaded washers that would mar surfaces of the camera 26 and the fastener axle 1. A V-washer 52 accomplishes this objective. Legs of the V shape can point inwardly like a pressure washer used for spark plugs or outwardly. With this embodiment, the bolt-head recess 40 can be shallow and a conical bolt shaft 5B in a match-tapered orifice 54 can be employed to provide rotational locking of the attachment bolt 2 in the fastener axle 1. The plain washer 51 can be employed to isolate abrasion of the lock-bolt nut 35 from an aluminum fastener axle 1. For this embodiment the fastener axle 1 is thread-lock bolted to a camera 26 by merely hand-turning the fastener axle 1 tightly into the camera bolt hole 25.

Referring to FIG. 7, the thread-locking means for the attachment bolt 2 can be a lock nut 55 that is rotatable in thread-tightening opposition to the attachment-bolt threads 39 when the attachment-bolt threads 39 are screwed inside of a camera bolt hole 25. The lock nut 55 can have a circumferential outside periphery that is knurled to be hand-turned easily. An attachment-bolt head 56 can be cylindrical as shown or hex-shaped as desired and positioned in a matching bolt-head receptacle 57 where the attachment bolt 2 can be held in position by an attachment-bolt stem 58 having threads 59 with which the attachment-bolt stem 58 is thread-drawn with a lock-bolt nut 35 in opposition to bolt-head receptacle 57. This embodiment allows length of the attachment-bolt stem 58 to be sufficient for thread-locking resilience of the threads 59, such that a plain washer 51 can be employed instead of a lock washer similar to lock-bolt lock washer 46.

This structure allows separation of the outside bearing section 4 and the inside bearing section 5 into separable bearing sections 4 and 5 of the fastener axle 1, Between the separable bearing sections 4 and 5 can be positioned a hard-metal lock section 60 as a design alternative to fastener-lock section 3 which is constructed of the same material as the fastener axle 1, This allows use of aluminum for construction of the fastener axle 1 while using a hard metal for the fastener-lock section B that is formed separately as hard-metal lock section 60. Hard-metal structure of the fastener-lock section 3 in this manner allows wider design selection of forms of fastener-lock sections 3 in combination with matching forms of fastener locks 10.

Outside bearing step 61 and inside bearing step 62 can be provided to position the hard-metal lock section 60 with lock serrations 63 radially inward from a circumferential outside periphery of the separable bearing sections 4 and 5. An inside periphery 64 of the hard-metal lock section 60 can be positioned snugly on the bearing steps 61 and 62 with concentricity of the steps 61 and 62 and the inside periphery 64 to establish and maintain concentricity of the separable bearing sections 4 and 5 of the fastener axle 1.

Referring to FIG. 8, the outside bearing step 61 and the inside bearing step 62 shown in FIG. 7 can be provided with external threading 65 onto which internal threading 66 of the inside periphery 64 of the hard-metal lock section 60 can be threaded. Threaded steps 61 and 62 can have sufficient length and threaded hard-metal lock section 60 can have sufficient corresponding length to hold the two separable bearing sections 4 and 5 together. An attachment bolt 2 having a split end 37 can be employed with the lock bolt 32 extended through the attachment bolt 2 to a lock-bolt nut 35 as described in relation to FIG. 5. Also as described in relation to FIG. 5, either a hex head 47 in a hex orifice 48 or a cylindrical head 67 in a cylindrical orifice 68 can be employed with the sanhe working relationship of parts. This design of the fastener axle 1 allows use of split-end thread-locking means, hard-metal fastener-locking means and long-bolt resilience in a long-lasting and convenient form.

Referring to FIG. 9, a rubber-like fastener lock 69 can be employed as an alternative to a serrated fastener lock 10 shown in FIG. 1. This design tradeoff is particularly useful for single-unit construction of the fastener axle 1 with aluminum and with small axle serrations 23.

Referring to FIG. 10, at least one location tooth 70 can be employed on a limited-tooth fastener lock 71 in place of either the rubber-like fastener lock 69 or the fastener lock 10. The limited-tooth fastener lock 71 is for use in conjunction primarily with a hard-metal lock section 60 that can be positioned on steps 61 and 62 with or without threading 65 and 66 as described in relation to FIGS. 7–8.

Various modifications may be made of the invention without departing from the scope thereof and it is desired, therefore, that only such limitations shall be placed thereon as are imposed by the prior art and which are set forth in the appended claims.

What is claimed is:

1. A camera quick-release tripod fastener comprising a fastener axle having an attachment bolt extended from an attachment end of the fastener axle,
    a fastener-lock section intermediate bearing sections on a circumferential outside periphery of the fastener axle,
    a fastener housing with a fastener bay having a cylindrical inside periphery in which the fastener axle is insertable with the bearing sections on the outside periphery of the fastener axle in rotational contact with the cylindrical inside periphery of the fastener bay,
    a lock latch that is pivotal on a latch axle that is attached to the fastener housing in parallel relationship to axes of the fastener bay and the fastener axle,
    a fastener lock on the lock latch in pivotally engageable relationship with the fastener-lock section on the circumferential outside periphery of the fastener axle,
    a latch handle extended from the lock latch perpendicularly to the latch axle,
    a housing handle extended from the fastener housing in a direction selectively parallel to the latch handle,
    a fastener spring positioned in distance-decreasing tensional relationship between the fastener-lock and the fastener-lock section on the circumferential outside periphery of the fastener axle and with the fastener spring positioned in distance-increasing tensional relationship between the latch handle and the housing handle, and
    at least one attachment-bolt hole oppositely disposed from the fastener bay in the fastener housing.

2. A camera quick-release tripod fastener as claimed in claim 1 and further comprising a thread-lock means on the attachment bolt.

3. A camera quick-release tripod fastener as claimed in claim 2, wherein the thread-lock means is a conical head of a lock bolt extended through an axial lock orifice in the attachment bolt to a lock-bolt nut with which the conical head of the lock bolt is rotationally thread-drawn against a split end of the attachment bolt to spread opposite sides of the split end of the attachment bolt inside of an attachment-bolt hole in a camera to spread-lock the attachment bolt in the attachment-bolt hole by rotating the lock-bolt nut on the lock bolt.

4. A camera quick-release tripod fastener as claimed in claim 3, wherein the fastener axle is threaded internally to receive a threaded shaft of the attachment bolt,
   the attachment bolt has a bolt head which fits in a bolt-head recess in an insertional end of the fastener axle,
   a lock washer is positioned in thread-locking relationship intermediate the bolt head of the attachment bolt and a seat end of the bolt-head recess in the insertional end of the fastener axle,
   the axial lock orifice in the attachment bolt is extended through the bolt head of the attachment bolt,
   the lock bolt is extended through the axial lock orifice in the attachment bolt and in the bolt head of the attachment bolt and threaded into a lock-bolt nut positioned in the bolt-head recess in the insertional end of the fastener axle, and
   the conical head of the lock bolt is rotationally thread-drawn against the split end of the attachment bolt to spread the opposite sides of the split end of the attachment bolt inside of the attachment-bolt hole in the camera to spread-lock the attachment bolt in the attachment-bolt hole by rotating the lock-bolt nut on the lock bolt.

5. A camera quick-release tripod fastener as claimed in claim 2, wherein the thread-lock means is a lock washer having smooth edges positioned between a camera surface and the attachment end of the fastener axle.

6. A camera quick-release tripod fastener as claimed in claim 5, wherein the lock washer is a conical type having opposite outside surfaces of oppositely beveled sides positioned between contact surfaces of the camera and the attachment end of the fastener axle.

7. A camera quick-release tripod fastener as claimed in claim 2, wherein the thread-lock means is a lock nut which can be positioned on the attachment bolt intermediate a camera and the fastener axle, and a lock-nut grip extended radially from the lock nut to a position of accessibility from a side of the camera for rotating the lock nut snugly against the camera in lock-nut relationship to threads on the attachment bolt that are threaded into an attachment-bolt hole in the camera.

8. A camera quick-release tripod fastener as claimed in claim 1, wherein the fastener-lock section intermediate bearing sections on the circumferential outside periphery of the fastener axle is a plurality of linear axle serrations extended parallel to an axis of the fastener axle.

9. A camera quick-release tripod fastener as claimed in claim 8, wherein the fastener lock on the lock latch is a select plurality of linear lock serrations which are sized and shaped to be interspersed in juxtaposed relationship between the linear axle serrations, and the linear lock serrations are juxtaposed in an arc having a matching circumferential relationship to the fastener axle.

10. A camera quick-release tripod fastener as claimed in claim 8, wherein the fastener lock is a resilient member attached to the lock latch.

11. A camera quick-release tripod fastener as claimed in claim 1, wherein the fastener-lock section intermediate bearing sections on the circumferential outside periphery of the fastener axle is a plurality of location notches juxtaposed circumferentially on the fastener axle at a position of pivotal contact by the lock latch,
   at least one location tooth is positioned on the lock latch, and
   the location tooth is sized and shaped to fit into either one of the location notches.

12. A camera quick-release tripod fastener as claimed in claim 1, wherein the fastener spring is an expansion type of coil spring having a coil axis perpendicular to the latch handle,
   a spring orifice in which the fastener spring is positioned intermediate
   a handle channel in the fastener housing and an outside surface of the fastener housing, and
   a set screw threadable into the spring orifice with the fastener spring intermediate the set screw and the latch handle.

13. A camera quick-release tripod fastener as claimed in claim 1, wherein the fastener spring is an expansion type of coil spring having a coil axis selectively parallel to the latch handle,
   a second spring orifice in which the fastener spring is positioned intermediate a lock-latch channel in the fastener housing and an outside surface of the fastener housing, and
   a second set screw threadable into the spring orifice with the fastener spring intermediate the set screw and the lock latch.

14. A camera quick-release tripod fastener as claimed in claim 1 and further comprising:
   a lock-engagement bolt that is threadable selectively in a lock-bolt orifice that is in communication between a latch-handle bay and an outside periphery of the fastener housing,
   an internal end of the lock-engagement bolt being thread-positioned selectively in contact with the latch handle, and
   an external end of the lock-engagement bolt having a hand-rotatable head.

15. A camera quick-release tripod fastener comprising:
   a fastener axle having an attachment bolt extended frown an attachment end of the fastener axle,
   a fastener-lock section intermediate bearing sections on a circumferential outside periphery of the fastener axle,
   a fastener housing with a fastener bay having a cylindrical inside periphery in which the fastener axle is insertable with the bearing sections on the outside periphery of the fastener axle in rotational contact with the cylindrical inside periphery of the fastener bay,
   a lock latch that is pivotal on a latch axle that is attached to the fastener housing in parallel relationship to axes of the fastener bay and the fastener axle,
   a fastener lock on the lock latch in pivotally engageable relationship with the fastener-lock section on the circumferential outside periphery of the fastener axle,
   a latch handle extended from the lock latch perpendicularly to the latch axle, a housing handle extended from the fastener housing in a direction selectively parallel to the latch handle, a fastener spring positioned in distance-decreasing tensional relationship between the fastener-lock and the fastener-lock section on the circumferential outside periphery of the fastener axle and with the fastener spring positioned in distance-increasing tensional relationship between the latch handle and the housing handle, at least one attachment-bolt hole oppositely disposed from the fastener bay in the fastener housing, a thread-lock means on the attachment bolt, lock-engagement bolt that is threadable selectively in a lock-engagement-bolt orifice that is in communication between a latch-handle bay and an outside periphery of the fastener housing, an internal end of the lock-engagement bolt being thread-positioned selectively in contact with the latch handle, and an external end of the lock-engagement bolt having a hand-rotatable head.

16. A camera quick-release tripod fastener as claimed in claim 15, wherein the thread-lock means is a conical head of a lock bolt extended through an axial lock orifice in the attachment bolt to a lock-bolt nut with which the conical head of the lock bolt can be rotationally thread-drawn against a split end of the attachment bolt to spread opposite sides of the split end of the attachment bolt inside of an attachment-bolt hole in a camera to spread-lock the attachment bolt in the attachment-bolt hole by rotating the lock-bolt nut on the lock bolt.

17. A camera quick-release tripod fastener as claimed in claim 16, wherein the fastener axle is threaded internally to receive a threaded shaft of the attachment bolt, the attachment bolt has a bolt head which fits in a bolt-head recess in an insertional end of the fastener axle, a lock washer is positioned in thread-locking relationship intermediate the bolt head of the attachment bolt and a seat end of the bolt-head recess in the insertional end of the fastener axle, the axial lock orifice in the attachment bolt is extended through the bolt head of the attachment bolt, the lock bolt is extended through the axial lock orifice in the attachment bolt and in the bolt head of the attachment bolt and threaded into a lock-bolt nut positioned in the bolt-head recess in the insertional end of the fastener axle, and the conical head of the lock bolt is rotationally thread-drawn against the split end of the attachment bolt to spread the opposite sides of the split end of the attachment bolt inside of the attachment-bolt hole in the camera to spread-lock the attachment bolt in the attachment-bolt hole by rotating the lock-bolt nut on the lock bolt.

18. A camera quick-release tripod fastener as claimed in claim 15, wherein the thread-lock means is a lock washer having smooth edges positioned between a camera surface and the attachment end of the fastener axle.

19. A camera quick-release tripod fastener as claimed in claim 18, wherein the lock washer is a conical type having opposite outside surfaces of oppositely beveled sides positioned between contact surfaces of the camera and the attachment end of the fastener axle.

20. A camera quick-release tripod fastener as claimed in claim 15, wherein the thread-lock means is a lock nut which can be positioned on the attachment bolt intermediate a camera and the fastener axle, and a lock-nut grip extended radially from the lock nut to a position of accessibility from a side of the camera for rotating the lock nut snugly against the camera in lock-nut relationship to threads on the attachment bolt that are threaded into an attachment-bolt hole in the camera.

21. A camera quick-release tripod fastener as claimed in claim 15, wherein the fastener-lock section intermediate bearing sections on the circumferential outside periphery of the fastener axle is a plurality of linear axle serrations extended parallel to an axis of the fastener axle.

22. A camera quick-release tripod fastener as claimed in claim 21, wherein the fastener lock on the lock latch is a select plurality of linear lock serrations which are sized and shaped to be interspersed in juxtaposed relationship between the linear axle serrations, and the linear lock serrations are juxtaposed in an arc having a matching circumferential relationship to the fastener axle.

23. A camera quick-release tripod fastener as claimed in claim 21, wherein the fastener lock is a resilient member attached to the lock latch.

24. A camera quick-release tripod fastener as claimed in claim 15, wherein the fastener-lock section intermediate bearing sections on the circumferential outside periphery of the fastener axle is a plurality of location notches juxtaposed circumferentially on the fastener axle at a position of pivotal contact by the lock latch, at least one location tooth is positioned on the lock latch, and the location tooth is sized and shaped to fit into a select one of the location notches.

25. A camera quick-release tripod fastener as claimed in claim 15, wherein the fastener spring is an expansion type of coil spring having a coil axis perpendicular to the latch handle, a spring orifice in which the fastener spring is positioned intermediate a handle channel in the fastener housing and an outside surface of the fastener housing, and a set screw threadable into the spring orifice with the fastener spring intermediate the set screw and the latch handle.

26. A camera quick-release tripod fastener as claimed in claim 15, wherein the fastener spring is an expansion type of coil spring having a coil axis selectively parallel to the latch handle, a second spring orifice in which the fastener spring is positioned intermediate a lock-latch channel in the fastener housing and an outside surface of the fastener housing, and a second set screw threadable into the spring orifice with the fastener spring intermediate the set screw and the lock latch.

27. A method for using a camera quick-release tripod fastener comprising:

a fastener axle having an attachment bolt extended from an attachment end of the fastener axle, a fastener-lock section intermediate bearing sections on a circumferential outside periphery of the fastener axle, a fastener housing with a fastener bay having a cylindrical inside periphery in which the fastener axle is insertable with the bearing sections on the outside periphery of the fastener axle in rotational contact with the cylindrical inside periphery of the fastener bay, a lock latch that is pivotal on a latch axle that is attached to the fastener housing in parallel relationship to axes of the fastener bay and the fastener axle, a fastener lock on the lock latch in pivotally engageable relationship with the fastener-lock section on the circumferential outside periphery of the fastener axle, a latch handle extended from the lock latch perpendicularly to the latch axle, a housing handle extended from the fastener housing in a direction selectively parallel to the latch handle, a fastener spring positioned in distance-decreasing tensional relationship between the fastener-lock and the fastener-lock section on the circumferential outside periphery of tile fastener axle and with the fastener spring positioned in distance-increasing tensional relationship between the latch handle and the housing handle, at least one attachment-bolt hole oppositely disposed from the fastener bay in the fastener housing, a thread-lock means on the attachment bolt, lock-engagement bolt that is threadable selectively in a lock-engagement-bolt orifice that is in communication between a latch-handle bay and an outside periphery of the fastener housing, an internal end of the lock-engagement bolt being thread-positioned selectively in contact with the latch handle, and an external end of the lock-engagement bolt having a hand-rotatable head;

the method comprising the following steps:

attaching the fastener axle to a camera by screwing the attachment bolt into an attachment-bolt hole in the camera, actuating the thread-lock means to lock threads of the attachment bolt to threads of the attachment-bolt hole in the camera, attaching the fastener housing to a desired camera stand by screwing a stand-attachment bolt into an attachment-bolt hole in the fastener housing, attaching the camera to the desired camera stand by inserting the fastener axle into the fastener bay while the latch handle is squeezed towards the housing handle to pivot the lock latch to a disengagement position, releasing the latch handle to allow spring pressure of the fastener spring to engage the lock latch with the fastener-lock section in order for the fastener axle and the camera attached to the fastener axle to be retained thereby in a desired circumferential position relative to the fastener housing and the camera stand, hand-squeezing the latch handle in a direction towards the housing handle for pivoting the lock latch to a position of disengagement with the fastener-lock section in order to rotate the fastener axle and the camera attached thereto as desired for changing circumferential positioning of the camera relative to the camera stand, and hand-squeezing the latch handle in a direction towards the housing handle for pivoting the lock latch to a position of disengagement with the fastener-lock section in order to remove and to replace the fastener axle and the camera attached thereto as desired.

28. A method for using a camera quick-release tripod fastener as claimed in claim 27 and further comprising:

engaging the lock-engagement bolt with the latch handle as desired for preventing the latch handle from being squeezed towards the housing handle as desired in order to hand-grasp and utilize the latch handle and the housing handle combined as a single handle without releasing the lock latch from locking engagement with the fastener-lock section, and disengaging the lock-engagement bolt from contact with the latch handle for hand-squeezing the latch handle in a direction towards the housing handle for utilizing the latch handle to engage and to disengage the latch lock and the fastener-lock section.

* * * * *